United States Patent [19]
Kopp

[11] Patent Number: 6,058,960
[45] Date of Patent: May 9, 2000

[54] DEVICE SERVING AS A VALVE INSERT FOR FLUID CONTAINERS UNDER PRESSURE

[75] Inventor: Volker Kopp, Esskingen, Switzerland

[73] Assignee: C. Ehrensperger AG, Switzerland

[21] Appl. No.: 09/039,527

[22] Filed: Mar. 16, 1998

[30] Foreign Application Priority Data

Mar. 14, 1997 [DE] Germany .......................... 197 10 541

[51] Int. Cl.[7] .......................... F16K 17/14; B65D 83/70
[52] U.S. Cl. .......................... 137/68.11; 251/354; 222/397
[58] Field of Search .......................... 197/68.11, 68.19, 197/68.23; 251/339, 354; 222/396, 397, 402.1

[56] References Cited

U.S. PATENT DOCUMENTS

| 3,385,481 | 5/1968 | Frangos | 222/396 |
| 5,762,319 | 6/1998 | Kopp. | |
| 5,848,740 | 12/1998 | Burghaus | 222/397 |

Primary Examiner—John Fox

[57] ABSTRACT

A device serving as a valve insert for pressurized fluid containers includes a valve plate, a valve body and a valve piston. The valve piston has at least one predetermined breaking point.

20 Claims, 4 Drawing Sheets

DEVICE SERVING AS A VALVE INSERT FOR FLUID CONTAINERS UNDER PRESSURE

BACKGROUND OF THE INVENTION

1. Field of the Invention

The invention relates to a device serving as a valve insert and more particularly to a valve insert for pressurizing fluid containers.

Discussion of Relevant Art

Such devices are known, for example from German Patent DE 44 26 730.

In order to reduce dangers from the improper use of pressurized fluid containers, for example aerosol cans, the German Pressurized Gas Packaging Statutory Regulation TRG 300 requires that pressurized gas packages do not explode even when heated to 50° C.

Nevertheless, accidents frequently occur in practice because users exceed the legally prescribed absolutely safe heating temperature of 50° C.

When using pressurized packages with a single component, the package contents frequently become viscous when the temperature falls, for example when the pressurized package is used outdoors. Because the pressure in the package decreases with the fall in temperature, the exit speed of the material dispensed simultaneously falls. In such a situation, the user of the pressurized package facilitates its use by heating the package, so that occasionally the temperature of 50° C. is exceeded and the package explodes. This can lead to serious injuries.

Besides this, a temperature increase to over 50° C. can occur during the use of pressurized packages with two different chemical components, in that the exothermic chemical reaction heats the package contents, and as a result the pressure in the can simultaneously rises. Furthermore, the chemical reaction runs faster due to the increase in temperature, so that a further heating takes place. In the use of pressurized packages with several components that react with each other, the temperature of 50° C. can be exceeded and an explosion of the package results, in spite of correct use.

SUMMARY OF THE INVENTION

The object of the present invention is to increase the safety of pressurized packages.

This object is achieved according to the invention by a valve insert for pressurized fluid containers having a valve plate, a valve body, and a valve piston having at least one predetermined breaking point.

A controlled reduction of the excess pressure is made possible by the predetermined breaking point, without the pressurized fluid container bursting and consequent injuries caused by flying fragments of the fluid container.

In contrast to the heretofore known valve pistons of solid material, the valve piston according to the invention has an at least partially hollow lug, so that material is saved. Preferably the lug is of a tubular shape. The lug can however have another shape, for example, in the form of a hemisphere. Insofar as the device has a valve piston with a partially hollow lug, it is advantageous for the predetermined breaking point to be a weakening of the wall of the lug.

For certain embodiments, it is advantageous if the lug has ribs facing outward. These ribs can serve both as guides in a spring valve, and also for mechanical stabilization of the lug in the tilting valve.

The predetermined breaking points are arranged between the ribs. It is likewise possible for at least one rib to have at least one predetermined breaking point.

The predetermined breaking point can be formed in different ways. In particular, notches, grooves, or fluting, facing either inward, outward, or both inward and outward, have proved to be effective. The predetermined breaking point can be, for example, a weakening of the wall or of a rib.

In general, the lug cover and/or lug floor serve to prevent the fluid under pressure coming out through the inner passage bore of the valve body to the outside.

If a lug has a lug cover and/or lug floor connected to it, these are connected integrally together.

In a preferred embodiment the valve piston is movably guided by the valve lug along a geometrical long axis, and the lug has sealing lips that run around it. A valve spring fastened to the valve body acts on the valve piston.

The use of thermoplastic plastics for the production of a valve body and valve piston has the advantage that a softening of the thermoplastics takes place due to the increase in temperature simultaneously accompanying the rise in pressure, and the thermoplastics can yield to the pressure, particularly at the predetermined breaking point. Polyethylene has proved to be particularly effective here.

Elastic valve bodies, preferably valve bodies of rubber, are suitable for the production of valve insert devices for tilting valves.

In order to make the desired controlled pressure equalization possible by means of the predetermined breaking point in tilting valves with elastic valve bodies, it is advantageous to provide the predetermined breaking point, not on the lug that crosses the internal passage bore of the valve body, but on an additional lug. It is likewise possible to provide the predetermined breaking point on the lug floor of the lug itself that passes through the inner passage bore.

The whole device must of course not permit diffusion. This can be attained, irrespective of the shape of the individual parts, by the choice of the materials for the valve plate, the valve body, and the valve piston. If however a material is used that does not ensure the required diffusion-tightness because of other favorable properties, the device or its individual parts can be coated with a coating material, for example, paraffin wax or a vapor-deposited metallic layer.

The valve insert device according to the invention is particularly suitable for use in pressurized packages.

BRIEF DESCRIPTION OF THE DRAWINGS

The invention will now be described with reference to preferred embodiments, taken together with the drawings in which.

DETAILED DESCRIPTION OF PREFERRED EMBODIMENTS

Figure 1:
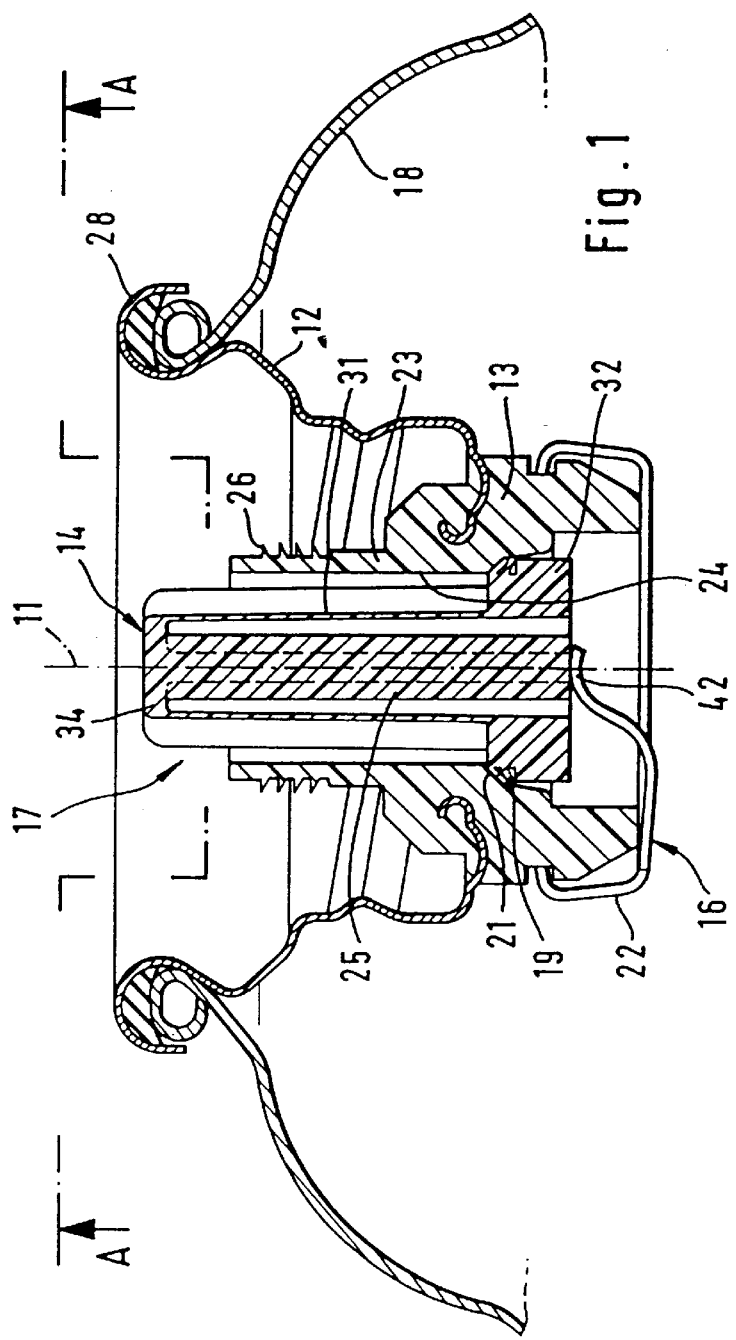
FIG. 1 shows a radial section through a valve insert device for a spring valve according to the invention.

FIG. 1 shows a valve plate 12 that is coaxial with the geometrical long axis 11 of the valve insert device, and around which a valve body 13 is partially injection molded and guides a valve piston 14 movably along the geometrical long axis 11. A valve spring 16 presses upward on the underside of the valve piston 14, pressing sealing lips 19 fluid-tight into a valve seat 21. A holding shank 22 of the valve spring 16 is clipped below to the valve body 13, in the manner of a yoke spring.

The valve body 13 has a central tube 23 with an inner through bore 24 that guides the valve piston 14 with little play. The upper region of the central tube 23 carries numerous sealing lips 26 that go completely around the central tube 23 on the outside and form a labyrinth seal.

In one end region, the valve plate 12 has a bell-shaped edge collar 28, which can be connected fluid-tight with a beaded edge of a fluid container 18.

The valve piston 14 (FIGS. 1, 2) includes a lug 31 that serves for guiding, and has a wall 36, and is hollow in an inner region 37 as far as a stub 25. An annular lug floor 32 adjoins the lug 31. A lug cover 34 integrally adjoins the guide lug 31 at the upper region of the guide lug 31, and has the downward-projecting stub 25 adjoined to it. A leaf spring 42 of the valve spring 16 acts on the underside of the stub 25.

Partial regions of the wall 36 of the guide lug 31 are formed as ribs 33 that serve for guiding on the inner through bore 24 of the central tube 23. The piston wall has a predetermined breaking point 17 that is created by a bursting wall 38 and 39 and 38' and 39'.

The material of the guide lug, the thickness of the wall 36, and the thickness of the wall between the notches 38, 39 has of course to be chosen such that the required sealing is insured for the propellant gas or other materials, but nevertheless that breaking will occur at the predetermined breaking points at a given pressure. The respective shaping of course depends on the kind of materials used, their diffusion-tightness, and their mechanical deformability under the respective gas pressure.

Figure 2:
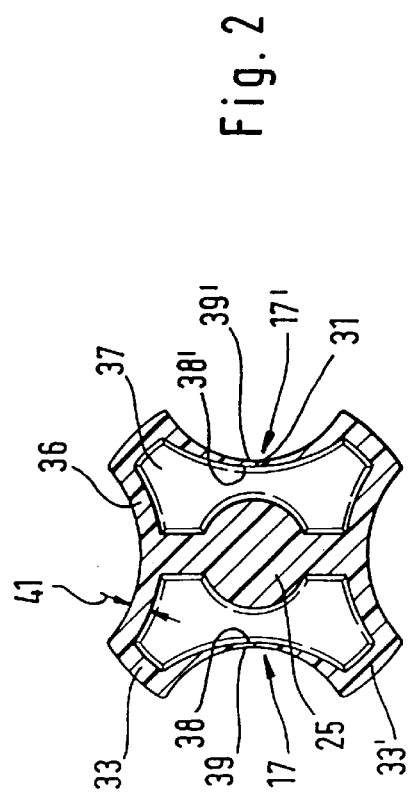
FIG. 2 shows the section A—A through FIG. 1.

The valve piston 14 and the valve body 13 are of polyethylene in the embodiment shown in FIGS. 1 and 2. The use of thermoplastic plastic for the production of the valve piston has the advantage that a softening of the plastic occurs due to the increase in temperature that takes place simultaneously with the pressure rise, and the plastic can yield more easily to the pressure, particularly at the predetermined breaking points. A further increase in the pressure then leads to breaking or tearing of the piston wall at the predetermined breaking point 17, thereby leading to the desired drop of pressure. This generally does take place with a sharp report, but a continuous outflow of liquid or gas takes place.

In a further embodiment (not shown in the drawing), the lug cover 34 has no stub 25, so that the whole region in FIG. 2 lying within the wall 36 is hollow. In this embodiment, a metal disk is provided between the lug floor 32 and the spring 16, and serves for the transmission of the pressure of the leaf spring 42 to the lug floor 32.

Figure 3:
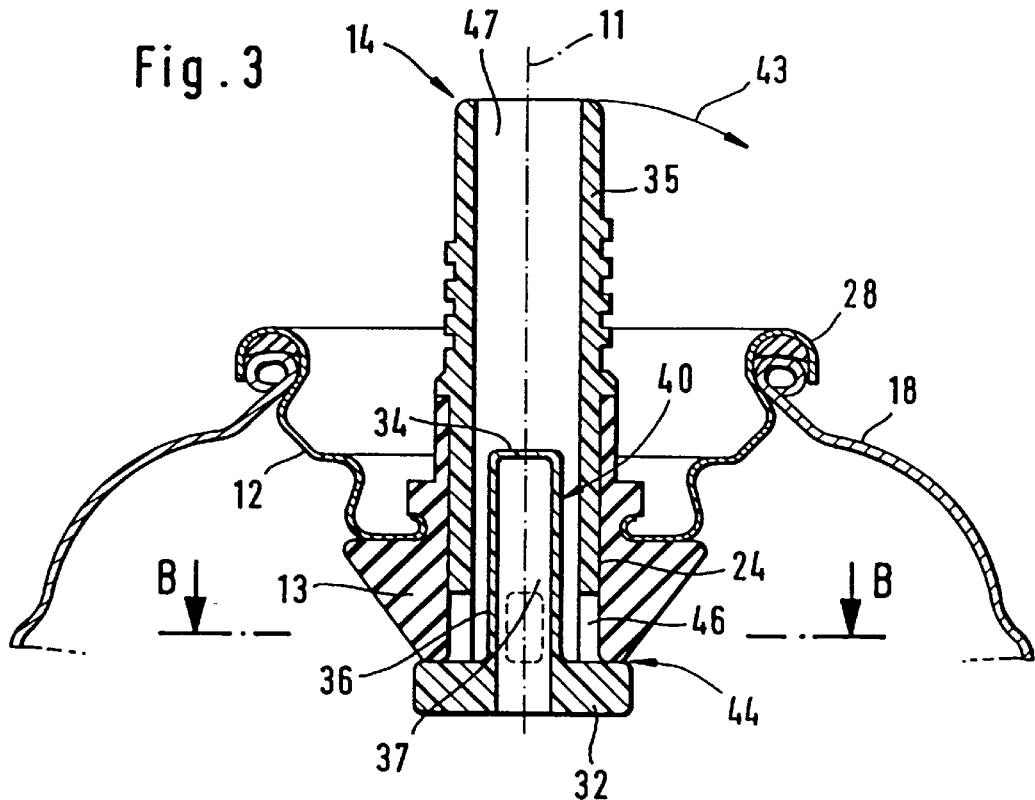
FIG. 3 shows a section through a first embodiment of a valve insert device for a tilting valve.
Figure 4:
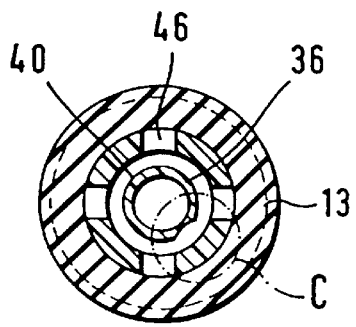
FIG. 4 shows the section B—B in FIG. 3.
Figure 5:
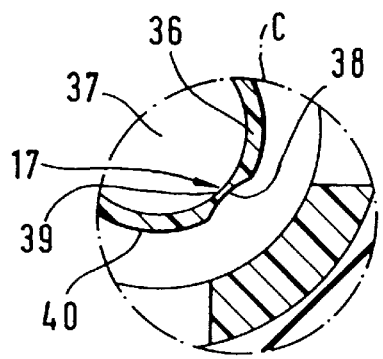
FIG. 5 shows an enlargement of the region C in FIG. 4.

FIGS. 3, 4 and 5 show a valve insert device for a tilting valve on a fluid container 18 under pressure. The valve insert device likewise includes a valve plate 12, a valve body 13 and a valve piston 14. In contrast to the embodiment illustrated in FIG. 1, the valve body 13 is made of an elastic material, preferably rubber.

The valve piston 14 includes a lug 35 that runs coaxially of the axis 11 and is connected at its underside to the annular lug floor 32 that seals the inner through bore 24. Four openings 46 are located above the lug floor 32.

An annular gap arises, according to the arrow 44, between the lower end of the valve body 13 and the upper side of the lug floor 32, when the valve piston 14 is tilted according to the arrow 43, and the fluid contained in the pressure can 18, flowing through the opening 46 and the cavity 47 in the lug 35, can emerge.

An additional lug 40 is connected to the lug floor 32, and is closed gas-tight above by the lug cover 34.

If the pressure in the can increases above a given threshold value due to a rise in temperature, the excess pressure acting on the inside of the wall 36 in the inner hollow region 37 of the lug 40 effects a break of the wall 36 at the predetermined breaking point 17 of the lug 40. The predetermined breaking point 17, shown enlarged in FIG. 5, is achieved by means of a weakening of the wall 36 facing inward 39 and outward 38.

Figure 6:
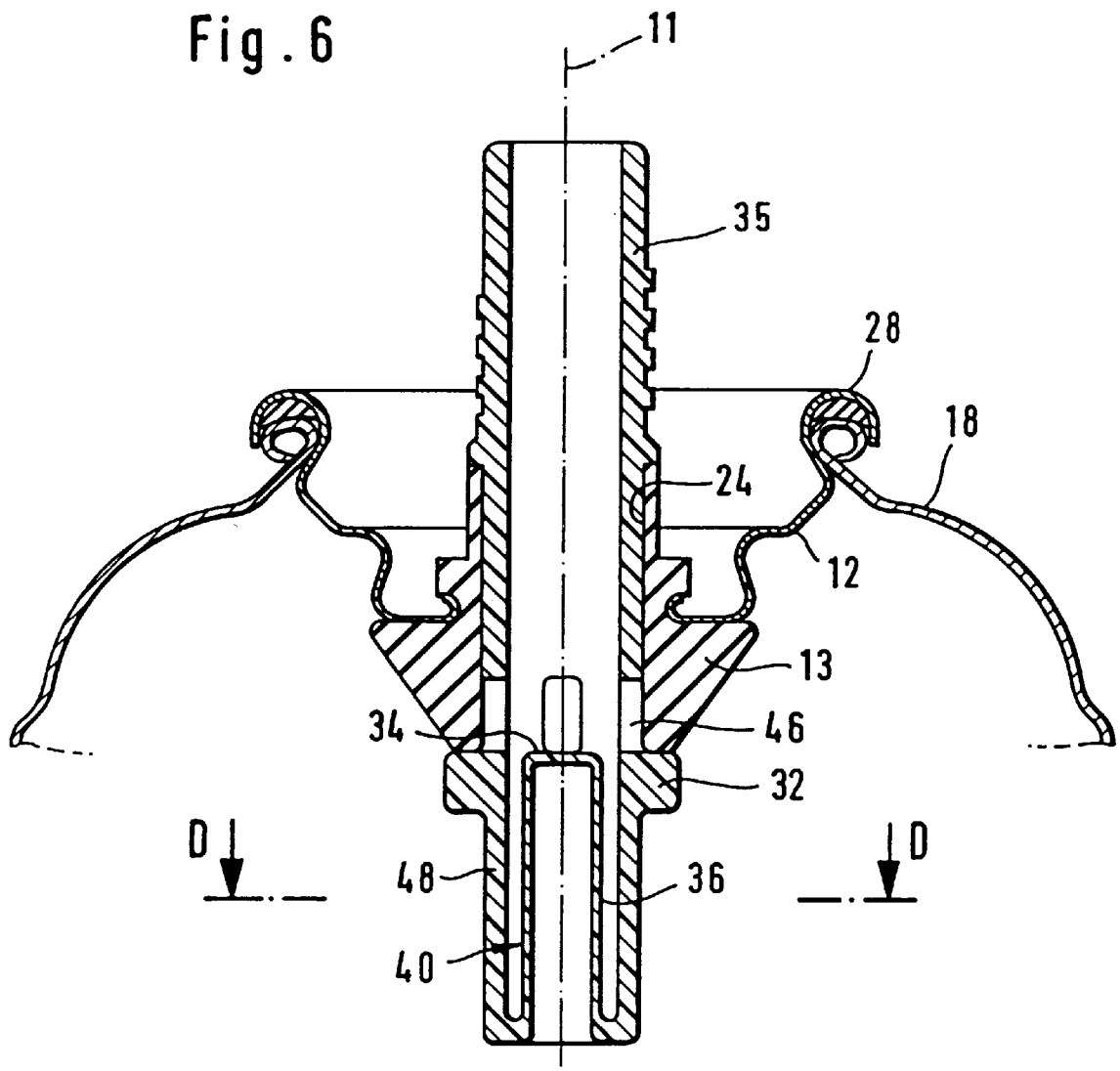
FIG. 6 shows a section through a second embodiment of a valve device for a tilting valve.
Figure 7:
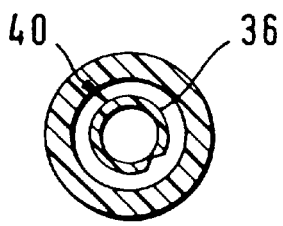
FIG. 7 shows the section D—D in FIG. 6.

FIGS. 6 and 7 show a further embodiment of a tilting valve. In contrast to the tilting valve shown in FIG. 3, a tubular piece 48 is provided on the lug floor 32, and is connected to the lug 40 carrying the predetermined breaking point 17.

If the pressure in the can 18 rises above a predetermined value, the lug breaks at the predetermined breaking point 17, due to the excess pressure acting on the wall 40 from inside. The wall 36 of the lug 40 and the predetermined breaking point 17 are constructed as shown in FIG. 5.

Figure 8:
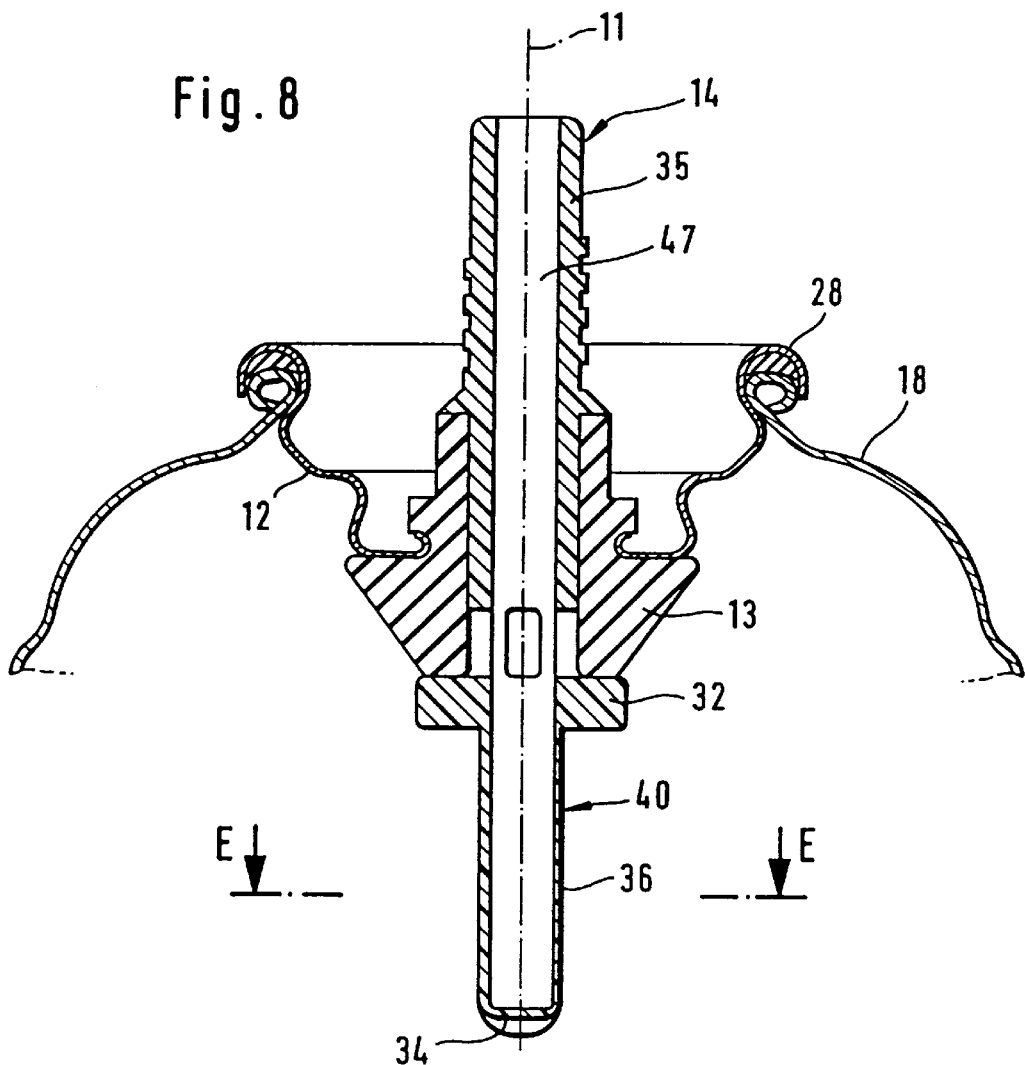
FIG. 8 shows a section through a third embodiment of a valve device for a tilting valve.
Figure 9:
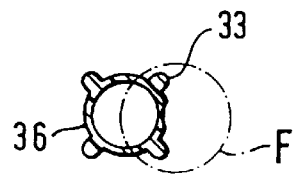
FIG. 9 shows the section E—E in FIG. 8.
Figure 10:
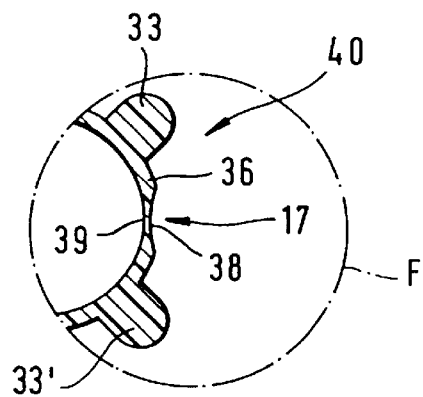
FIG. 10 shows an enlargement of the region F in FIG. 9.

The embodiment in FIGS. 8, 9 and 10 differs from the embodiments in FIGS. 3–7 in that the lug 40, which has the predetermined breaking point 17, adjoins the annular lug floor 32 downward. In this embodiment, the excess pressure acts from outside on the wall 36. In order to prevent deformations of the wall 36, the wall 36 has outward facing ribs 33, 33' that act as reinforcement.

When a predetermined pressure is exceeded, the lug 40 breaks open inward at the predetermined breaking point 17, and the pressure is relieved via the cavity 47 of the lug 48.

It is of course possible to provide the predetermined breaking point 17 at other places of the valve piston 14, for example, on the valve floor 32.

What is claimed is:

1. A valve insert for pressurized fluid containers comprising:
    a valve plate (12),
    a valve body (13)
    and a valve piston (14) having at least one predetermined breaking point (17), wherein said valve piston (14) has an at least partially hollow lug (31), said lug (31) has a wall (36) having a weakening that forms said at least one predetermined breaking point (17), said wall (36) has outward-facing ribs (33), and at least one of said outward-facings ribs (33) has said at least one predetermined breaking point (17).

2. The valve insert according to claim 1, in which said at least one predetermined breaking point (17) is located between said outward-facing ribs (33).

3. The valve insert according to claim 1, in which said at least one predetermined breaking point (17) is selected from a group consisting of a notch, a groove and a fluting, which faces inward or outward.

4. The valve insert according to claim 1, in which said predetermined breaking point (17) comprises at least one of a group consisting of a notch, a groove and a fluting, which faces inward and outward.

5. The valve insert according to claim 1, in which said lug (31) of said valve piston (14) has a substantially annular lug floor (32) at one end.

6. The valve insert according to claim 5, in which said lug (31) of said valve piston (14) has at its other end a lug cover (34) connected to said lug (31).

7. The valve insert according to claim 1, in which said piston (14) is movably guided by said lug (31) along a geometrical long axis (11), and said lug (31) has sealing lips (19) that run around said lug (31).

8. The valve insert according to claim 7, further comprising a valve spring (16) fastened to said valve body (13) that acts on said valve piston (14).

9. The valve insert according to claim 1, in which at least one of said valve body (13) and said valve piston (14) is comprised of plastic.

10. The valve insert according to claim 9, in which said plastic is a thermoplastic.

11. The valve insert according to claim 10, in which said plastic is polyethylene.

12. The valve insert according to claim 1, in which said valve body (13) is comprised of elastic material.

13. The valve insert according to claim 12, in which said valve body (13) is comprised of rubber.

14. The valve insert according to claim 1, in which said valve piston (14) has at least two lugs (35, 40) along a geometrical long axis of said valve insert, one lug (35) passes through an inner through-passage (24) of said valve body (13), and another lug (40) includes said predetermined breaking point (17).

15. The valve insert according to claim 14, in which said one lug (40) lies at least partially inside a tubular piece (48).

16. The valve insert according to claim 1, in which said valve insert substantially resists diffusion.

17. The valve insert according to claim 16, further comprising a coating material on said valve insert that substantially resists diffusion.

18. A valve insert according to claim 17, in which coating material comprises paraffin wax.

19. A valve insert according to claim 17, in which said coating material comprises a vapor-deposited metal layer.

20. A valve insert according to claim 1 in combination with a pressurized package.

* * * * *